United States Patent [19]
Bailey et al.

[11] Patent Number: 5,738,297
[45] Date of Patent: Apr. 14, 1998

[54] LEADER DISPENSER

[75] Inventors: John Bailey, Livingston, Mont.; Luke Mak, Hong Kong, Hong Kong; Eiji Hamachi, Osaka, Japan

[73] Assignee: Dan Bailey, Livingston, Mont.

[21] Appl. No.: 659,196

[22] Filed: Jul. 22, 1996

[51] Int. Cl.⁶ .................... B65H 49/14; B65H 75/02; A01K 97/06

[52] U.S. Cl. .................... 242/594.3; 242/588.4; 242/588.6; 242/137.1; 43/54.1

[58] Field of Search .................... 242/557, 594.3, 242/594.4, 137.1, 137, 138, 132, 146, 129.8, 588.4, 588.6, 405.1, 405.2, 388.6; 43/54.1, 43.11, 44.98; 225/34, 38, 47–50

[56] References Cited

U.S. PATENT DOCUMENTS

| | | | |
|---|---|---|---|
| 1,356,120 | 10/1920 | Bassisty | 242/594.3 |
| 2,494,106 | 1/1950 | Rengo | 225/38 |
| 2,517,866 | 8/1950 | Glahn | 242/137.1 |
| 2,553,097 | 5/1951 | Lampe | 43/54.1 |
| 2,656,131 | 10/1953 | Johnson | 225/38 |
| 3,032,914 | 5/1962 | Valle | 242/388.6 |
| 3,417,935 | 12/1968 | Douglas et al. | 242/588.4 |
| 3,446,343 | 5/1969 | Zimmer et al. | 242/588.6 |
| 3,612,427 | 10/1971 | Bishop | 242/137.1 |
| 3,972,459 | 8/1976 | Cooper | 225/47 |
| 4,026,063 | 5/1977 | Allen et al. | 242/137.1 |
| 4,141,479 | 2/1979 | Dennison | 242/137.1 |
| 4,290,223 | 9/1981 | Ostenberg et al. | 242/137.1 |
| 4,401,248 | 8/1983 | Helms | 242/588.4 |
| 4,475,699 | 10/1984 | Calvin | 242/137.1 |
| 4,527,722 | 7/1985 | Strachan | 242/594.3 |
| 4,586,671 | 5/1986 | Piana et al. | 242/594.3 |
| 4,676,446 | 6/1987 | Ciocarelli et al. | 242/588.6 |
| 4,862,635 | 9/1989 | Conte | 242/388.6 |

*Primary Examiner*—John M. Jillions
*Attorney, Agent, or Firm*—Richard C. Conover

[57] ABSTRACT

The present invention incorporates a one-piece yoke for dispensing leader from a leader spool. The yoke is provided with first and second wings joined by a foldable hinge. A decurling element is located on the hinge through which element leader can be drawn. As leader is drawn through this element, the leader is automatically decurled. Mating surfaces on each yoke permit multiple leader dispensers to be fastened together. A hollowed out female portion is provided on one wing and a male portion which is sized to be frictionally inserted in the female portion is provided on the other wing. These mating surfaces permit additional leader dispensers to be fastened together—a male portion of one yoke being inserted into the female portion of another yoke.

12 Claims, 3 Drawing Sheets

LEADER DISPENSER

BACKGROUND OF THE INVENTION

This invention relates to an improved leader dispenser incorporating a single one-piece yoke having structure for decurling leader as leader is stripped from a leader spool and for preventing the leader on the spool from unwinding when leader is not being stripped from the spool and further having structure for fastening multiple spools together to form a single multi-leader unit.

Fly fishermen have a problem in making tapered leader lines for their fly lines. Many of these fishermen make a tapered leader by using multiple leader line segments, each individual leader line segment possibly varying in length from the other segments used. The different leaders are tied together so that the diameter of succeeding leaders are ever-smaller as the multiple leaders extends toward the tip where a fly is tied onto the line. The individual leader segments attached in the sequence described thus taper the fly line tip. A problem comes about because the fly fisherman must have multiple spools of different line leader to tie the tapered leader. Further, when leader is stripped from a spool, the leader is curled. This makes it very difficult to tie or use the individual leader line segments.

Fishermen have long known that pulling curled leader through a piece of rubber will eliminate the curls and leave an elongated line with little tendency to curl. U.S. Pat. No. 4,290,223 to Ostenberg et al. shows a housing for holding a single spool of leader. The leader is drawn through opposed resilient pads so that the fisherman in withdrawing a length of leader through the resilient pads will erase coil memory during the dispensing operation.

Because leader can also just unwind from a spool unless the leader is held in some manner, leader on individual spools is often held in place by using rubber bands to encircle the leader on a spool or slipping the leader between two abutting surfaces forming the end walls of a spool. Other devices for preventing leader on a spool from unwinding are shown in U.S. Pat. No. 4,026,063 to Allen et al; U.S. Pat. No. 4,290,223 to Ostenberg et al.; and U.S. Pat. No. 4,475,699 to Calvin. In all of these patents a housing is used to contain the leader spool.

Further, keeping multiple spools of different sized leaders in some organized manner on the person of a fly fisherman, or in his tackle box, is a worthwhile objective since a number of different diameter leaders may be strewn about among the paraphernalia of a fly fisherman for the purpose of tying different size leaders on the fly line.

In the past, fishermen have either deposited individual spools of leader in their fishing vests for later use or have leader loaded on specially designed spools on individual axles in housings such as shown in U.S. Pat. Nos. 4,026,063 to Allen et al. and 4,475,699 to Calvin.

What is needed is a single one-piece device such as a yoke which can be folded around a single spool to hold the spool, with the yoke having additional structure for decurling leader as leader is drawn from the spool and also structure for attaching multiple spools together to make a single unit.

Although yokes for holding leader spools are not known, the use of a one-piece yoke to hold spools of tape are shown in U.S. Pat. Nos. 3,417,935 to Douglas et al. and U.S. Pat. No. 3,446,343 to Zimmer et al.

Devices which have been used to attach multiple spools together to keep the spooled material tidy are known in the non-leader field, such as shown in U.S. Pat. No. 4,586,671 to Piana et al. and U.S. Pat. No. 4,527,722 to Strachan.

In view of the above, it can be seen that fly fishermen need a leader dispenser that includes a single one-piece leader spool holder that includes structure to decurl the leader as the leader is stripped from a spool. The device should also be capable of keeping leader ready for use but held tightly on the spool so that the leader cannot unwind when leader is not being drawn from the spool. Each of the spool holders would include structure for fastening multiple spool holders together to 2keep leaders of different diameters in a tidy and organized package for easy access by fly fisherman.

SUMMARY OF INVENTION

The present leader spool invention includes a yoke having opposite first and second wings joined by a foldable hinge. In a preferred embodiment the hinge includes a pair of spaced apart fold lines which permit the wings to be folded together. Fittings are provided in each wing to be inserted in the central bore of a leader spool. Furthermore, when the first and second wings are brought together, a locking mechanism locks the ends together thus clasping the leader spool between the wings of the yoke.

A decurling element is located on the hinge between the two fold lines, through which element leader can be drawn. As leader is drawn through this element, leader on the spool is automatically decurled.

The decurling element includes a block of rubber, having a slit partially through the block. Leader from the spool is led through the slit in the rubber block to uncurl the leader as it is removed from the spool. The slit also frictionally holds the free end of the leader to keep the leader from unwinding on the spool.

Mating surfaces on each yoke permit multiple leader dispensers to be fastened together. A hollowed out female portion is provided on one wing and male portion which is sized to be frictionally inserted in the female portion is provided on the other wing. These mating surfaces permit additional leader dispensers to be fastened together, a male portion of one yoke being inserted into the female portion of the other yoke. Thus, multiple leader spools can be fastened together to form a single, multi-sectioned unit.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
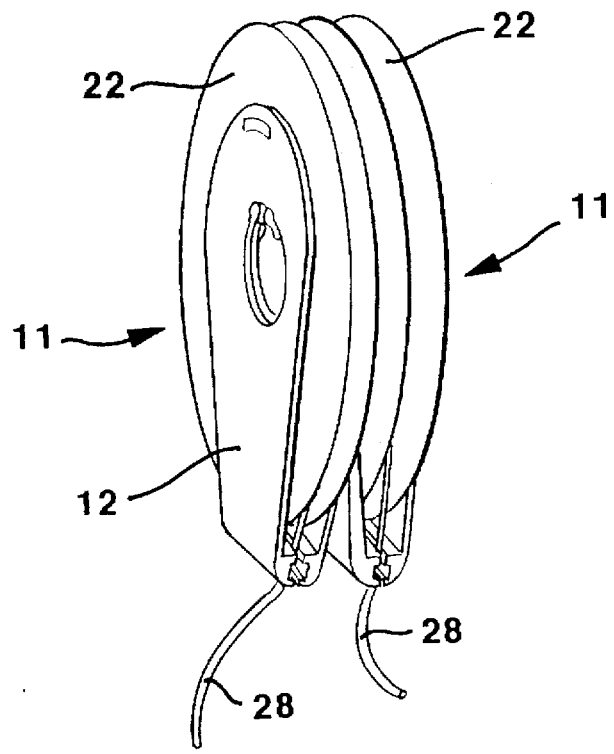
FIG. 1 is a perspective view of two leader dispensers of the present invention fastened together.

A preferred embodiment of a leader dispenser 11 is shown in FIG. 1 with two leader dispensers 11 units fastened together according to the present invention.

The leader dispenser 11 includes a yoke 12 having a generally flat sheet configuration with wings 14 and 16 joined by a hinge 18 having transverse fold lines 20 as shown in FIGS. 4-8. The yoke 12 is folded along fold lines 20 and is attached to spool 22 in a manner to be described subsequently.

Figure 2:
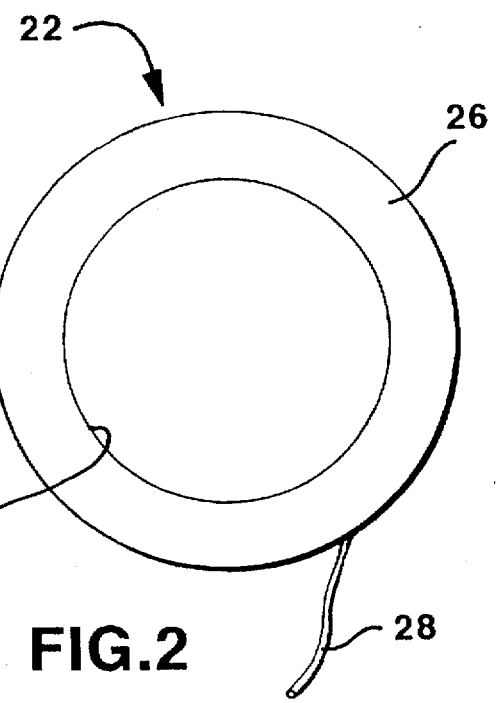
FIG. 2 is an elevational view of a leader spool.
Figure 3:
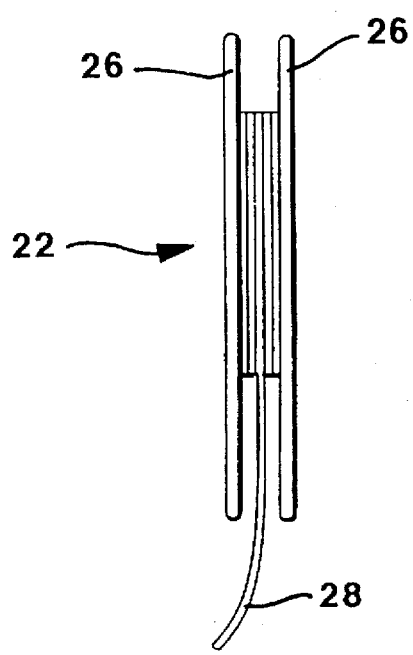
FIG. 3 is a side view of the leader spool shown in FIG. 2.

The spool 22, as shown in FIGS. 2 and 3, includes a central hollow cylinder having a central bore 25 with a pair of opposing spaced apart rims 26 extending outwardly from the central bore 25. Leader 28 is coiled on the central cylinder in a conventional manner and rims 26 serve to keep the leader coiled on the central hollow cylinder from tumbling off the spool when many turns of leader are placed on the spool.

A hollow cylindrical hub 30 is transversely mounted to an exterior surface of wing 16 and positioned to extend away from wing 16 for a distance greater than the width of spool 22 as shown in FIGS. 4, 5, 7 and 9. The wing 16 has a cut-away portion 32 and cylindrical hub 30 has a cut-away portion 34. The outside radius of cylindrical hub 30 is sized to fit loosely within the central bore 25 of spool 22. A hollow cylinder 36 is concentrically positioned inside cylindrical hub 30 and extends through wing 16 and away from the side of wing 16 opposite cylindrical hub 30. The cylinder 36 has a central bore 37. The cylinder 36 is further provided with an alignment slot 38 used in a manner described subsequently to align multiple leader dispenser 11 units when attached together as a single multiple-unit set.

Figure 4:
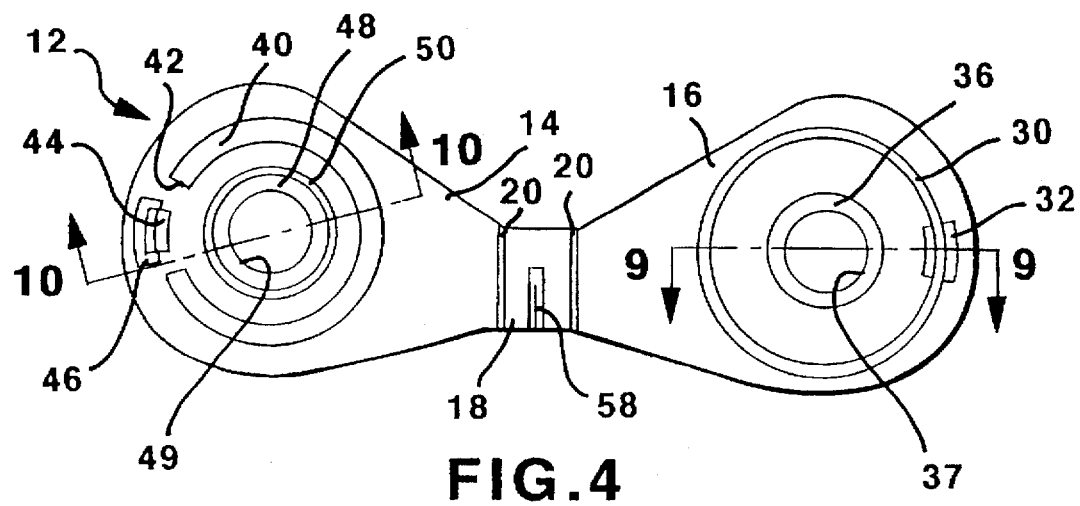
FIG. 4 is a top plan view of a leader dispenser yoke of the present invention.
Figure 5:
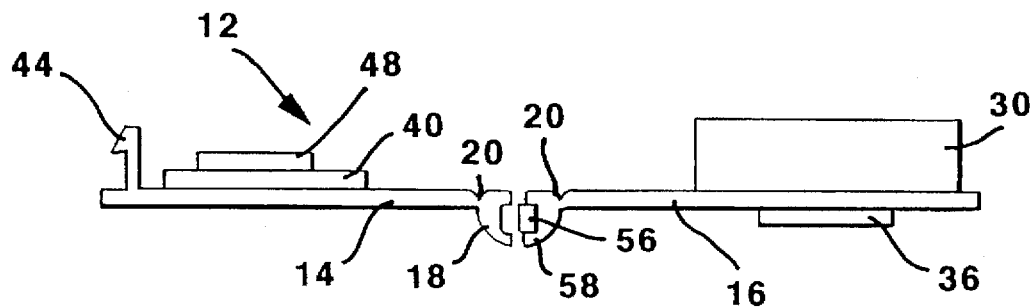
FIG. 5 is an elevational view of the leader dispenser yoke shown in FIG. 4.

On wing 14 a hollow cylindrical hub 40 is transversely mounted to an exterior surface of wing 14 as shown in FIGS. 4, 5, 6 and 10 and is positioned to mate with cylindrical hub 30. The outside diameter of cylindrical hub 40 is sized to fit loosely into the inside diameter of cylindrical hub 30 when wings 14 and 16 are folded together along fold lines 20. The cylindrical hub 40 has a cut-away portion 42. Within the cut-away portion 42, an upstanding latch 44 is provided as shown in FIGS. 4 and 5. The latch 44 is sized to step-lock with a wall of cut-away 34 located in cylindrical hub 30 and is used to lock the leader dispenser 11 onto spool 22 when wings 14 and 16 are folded together. Wing 14 is also provided with a cut-away 46.

Figure 10:
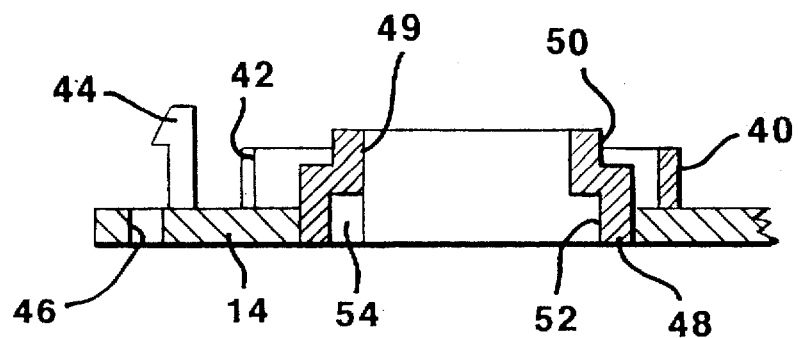
FIG. 10 is an enlarged cross-sectional view along line 10—10 in FIG. 4.

A hollow cylinder 48 is transversely mounted on wing 14 concentric with cylindrical hub 40 and extends through wing 14 but is formed flush with the opposite side of wing 14 as shown in FIG. 10. The cylinder 48 has a central bore 49 sized to have the same diameter of bore 37 of cylinder 36. The cylinder 48 is positioned so that bores 49 and 37 will be coaxially aligned when wings 14 and 16 are folded together. When wings 14 and 16 are folded together the walls of bores 49 and 37 provide a mechanism for receiving a dowel, for example, so that leader dispenser 11 can be displayed for marketing purposes.

Figure 8:
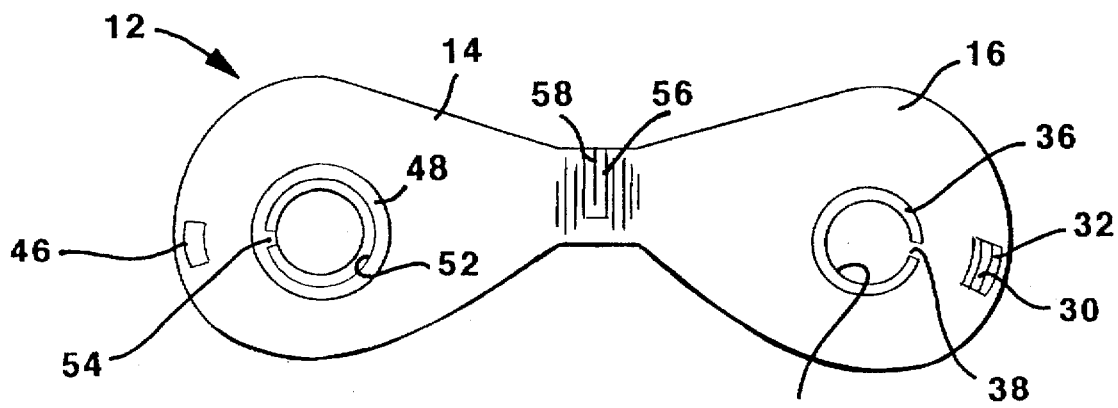
FIG. 8 is a bottom plan view of the leader dispenser yoke shown in FIG. 4.
Figure 6:
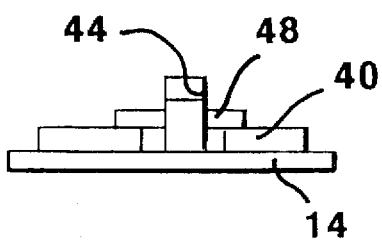
FIG. 6 is a left side view of the leader dispenser yoke shown in FIG. 5 with background parts removed.
Figure 7:
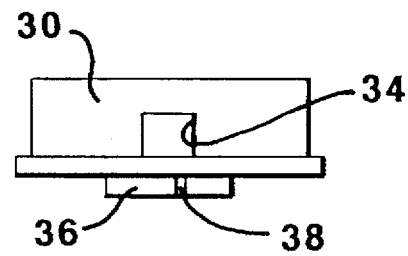
FIG. 7 is a right side view of the leader dispenser yoke shown in FIG. 5.
Figure 9:
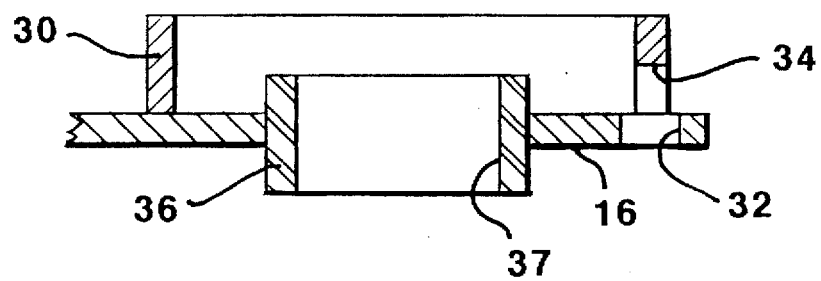
FIG. 9 is an enlarged cross-sectional view along line 9—9 in FIG. 4.

A portion of the cylinder 48 is cut-away to form a cylindrical lip 50 as shown in FIGS. 4 and 10. As shown in FIGS. 8 and 10, the end of cylinder 48 distal from lip 50 has a recessed lip 52 formed in cylinder 48. The inner radius of lip 52 is sized to frictionally accept the inner radius of cylinder 36 located on wing 16 of another leader dispenser 11 to frictionally and releasably attach two leader dispensers together. An indexing finger 54 is located in lip 52 and is aligned with alignment slot 38 of the second leader dispenser 11 attached to the first leader dispenser 11 to rotationally align the two leader dispensers when they are attached together.

As shown in FIGS. 4 and 5, the wings 14 and 16 are hinged together with a hinge element 18. The hinge element 18 is provided with fold lines 20 as shown. The hinge element 18 has a slot sized to receive a rubber or soft plastic block 56. This block 56 includes a transverse slit 58 through which leader 28 is drawn.

It should be understood that in the preferred embodiment all of the elements of yoke 12 with the exception of the block 56 are formed in one piece as by injection molding. The description of a separate hub 30, cylinder 36, hub 40 and cylinder 48 above was for purposes of descriptive clarity only. In the preferred embodiment these elements are all formed in one unit.

In operation, hub 30 is placed in the hollow center 25 of spool 22. Wing 14 is then folded over toward wing 16 along fold lines 20. This folding operation nests hub 40 within hub 30 and latch 44 engages a wall of cut-out 34 to lock the wings 14 and 16 together. Leader 28 is then stripped from spool 22 and drawn through slit 58 in block 56. Whenever more leader is needed, leader 28 is pulled through slit 28. By drawing leader through slit 28, the curl of the leader on the spool is significantly reduced as the leader is being stripped from the spool. Since the leader being drawn through the slit is frictionally retained by the slit, leader remaining on the spool 22 is prevented from unwinding when leader is not being drawn from the spool. If it is desired to fasten several leader dispensers 11 together for either storage or convenience, the cylinder 38 on wing 16 opposite the side of wing 16 on which hub 30 is located, is inserted in the lip 52 located on wing 14 of another leader dispenser. The indexing finger 54 is aligned with the alignment slot 38 of the adjacent leader dispenser 11 to rotationally align adjacent leader dispensers together so that various leaders may be drawn from the multi-section unit in approximately the same direction.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A leader dispenser comprising:
    a leader spool having leader wrapped thereon;
    a yoke having opposite first and second wings;
    the wings being joined with a hinge;
    the wings further having clasping means for releasably clasping the spool between the wings when the wings are folded together on each side of the spool; and
    a decurling means, located on the hinge, for decurling leader led through the decurling means as the leader is pulled from the spool and for preventing the remaining leader on the spool from unreeling.

2. The leader dispenser of claim 1 wherein the decurling means comprises a block of rubber, held in a receiving slot located in the hinge, the block having a slit opening through an edge and extending partially into the block, the slit sized to frictionally accept the leader.

3. The leader dispenser of claim 1 wherein the first wing is provided with a male portion and the second wing is provided with a releasably mating female portion whereby the male portion of one yoke may be releasably attached to the female portion of another yoke.

4. The leader dispenser of claim 3 wherein the female portion further includes an alignment slot and the male portion has an indexing finger sized to be received by the alignment slot whereby when the indexing finger of one yoke is inserted in the alignment slot of another yoke the two yokes are rotationally aligned.

5. The leader dispenser of claim 1 wherein tile clasping means includes a latching surface on the first wing and a snap latch on the second wing for frictionally latching the second wing to the latching surface of the first wing.

6. A leader dispenser comprising:

a leader spool including a central hollow cylinder having a longitudinal central bore therethrough;

a yoke having opposite first and second wings;

the wings being joined with a foldable hinge;

each wing having a first and an opposite second side;

the first wing having a hollow cylindrical hub formed on the first side of the first wing and sized to be received by the central bore of the leader spool when the wings are folded together on each side of the spool;

the wings folded together on each side of the spool to clasp the spool between the wings;

the cylindrical hub having a cut away portion, a wall of which serves as a latching surface;

the second wing having an upright snap latch positioned on the first side of the second wing to releasably engage the latching surface when the wings are folded together whereby the wings may be latched together; and a decurling means, located on the hinge, for decurling leader led through the decurling means as the leader is pulled from the spool and for preventing the remaining leader on the spool from unreeling.

7. The leader dispenser of claim 6 wherein the decurling means comprises a block of rubber, held in a receiving slot located in the hinge, the block having a slit opening through an edge and extending partially into the block, the slit sized to frictionally accept the leader.

8. The leader dispenser of claim 6 wherein the first wing is provided with a male portion and the second wing is provided with a releasably mating female portion whereby the male portion of one yoke may be releasably attached to the female portion of another yoke.

9. The leader dispenser of claim 6 wherein the female portion further includes an alignment slot and the male portion has an indexing finger sized to be received by the alignment slot whereby when the indexing finger of one yoke is inserted in the alignment slot of another yoke the two yokes are rotationally aligned.

10. The leader dispenser of claim 6 wherein the first wing includes a circular bore therethrough concentric with the cylindrical hub and the second wing has a circular bore therethrough sized to be substantially the same diameter as the bore through the first wing and which is positioned to be coaxially aligned with the bore through the first wing when the first and second wings are folded together.

11. The leader dispenser of claim 10 wherein an upright hollow cylinder having a longitudinal bore sized to be substantially the same diameter as the bore through the first wing is formed on the second side of the first wing coaxially with the bore through the first wing and wherein a depressed circular lip is formed on the second side of the second wing in a wall of the bore through the second wing and sized to frictionally receive the upright cylinder formed on the first wing whereby the hollow cylinder of one yoke may be frictionally inserted in the circular lip of another yoke.

12. The leader dispenser of claim 11 wherein the circular lip further includes an alignment slot and the upright cylinder includes an indexing finger sized to be received by the alignment slot whereby when the indexing finger of one yoke is inserted in the alignment slot of another yoke the two yokes are rotationally aligned.

* * * * *